UNITED STATES PATENT OFFICE.

CARLETON ELLIS, OF WHITE PLAINS, NEW YORK, ASSIGNOR TO CHADELOID CHEMICAL COMPANY, OF NEW YORK, N. Y., A CORPORATION OF WEST VIRGINIA.

PAINT OR VARNISH REMOVER.

956,320.  Specification of Letters Patent.  Patented Apr. 26, 1910.

No Drawing.  Application filed March 30, 1907. Serial No. 365,482.

*To all whom it may concern:*

Be it known that I, CARLETON ELLIS, a citizen of the United States, and resident of White Plains, in the county of Westchester and State of New York, have made certain new and useful Improvements Relating to Paint or Varnish Removers, of which the following is a specification.

This invention relates to paint or varnish removers and relates especially to removers comprising solvents of the acetal order.

Many oxidation products and alcoholic bodies of the acetal order are desirable solvents for use in finish removers. Acetal, which may be derived by treating ethyl alcohol with an oxidizing agent such as manganese dioxid and sulfuric acid is a pleasant smelling liquid boiling when pure at about 104° C. and having a specific gravity of .83. The methylacetal may be derived from methyl alcohol and the regulated oxidation of denatured alcohol produces mixed acetal products, such as methyl ethyl acetal, and so forth. A number of other compounds of the acetal order are desirable, including the oxy acetals, chlor acetals and other acetal derivatives. Such solvent material of a generally acetal character may be used in removers in connection with other loosening finish solvent material, that is solvent material having a generally alcoholic character or action in removers, such as methyl, ethyl, propyl, butyl, amyl, allyl, and other strict alcohols, preferably in their commercial forms, including denatured alcohol, acetone alcohols and other ketonic bodies such as methyl ethyl ketone, ethyl butyl ketone, oil of acetone, acetone and its condensation derivatives. Suitable penetrating finish solvent material, that is, solvent material having a generally benzolic character or action in removers may also be employed, such as benzol and its homologues and their commercial forms and also the somewhat analogous petroleum hydrocarbons such as benzin, as well as ethers, carbon-bisulfid, turpentine, wood turpentine, carbon-tetrachlorid, chlorbenzol, chlorhydrins and other chlorinated solvents.

Although not necessary in all cases, it is usually desirable to employ in the removers suitable stiffening material such as wood flour, starch, cork dust, Peruvian bark, refuse, ground peat, magnesia, whiting, infusorial earth, casein and other proteid material in the form of emulsions, if desired, and soapy or waxy bodies, such as casein, paraffin, bayberry tallow, Japan wax, carnauba, Chinese wax, beeswax, etc., as well as nitrated celluloses and other esters of cellulose. All the ingredients are preferably thoroughly incorporated by agitation at the desired moderate heat, the waxy, soapy or other evaporation retarding stiffening material being preferably first dissolved in the more energetic solvents therefor, although this is not always necessary. An illustrative remover of this character may comprise acetal 10 gallons, bezol 10 gallons, acetone 10 gallons, 7 pounds ceresin wax and 15 pounds cork dust. Another remover may comprise methyl ethyl acetal 5 gallons, acetal 10 gallons, ceresin wax 5 pounds, to which 10 gallons of benzol may be added, when a remover especially adapted for copal finish is desired. Another illustrative remover may comprise acetal 10 gallons and pyroxlin 10 pounds, to which may be added 4 gallons of benzol, toluol or perolic ether, 10 gallons of methyl ethyl ketone and 5 pounds of wax, such as ceresin, for use with paints and other finishes. Another illustrative remover may comprise acetal 60 gallons, denatured alcohol 10 gallons and ceresin or other waxy material 30 pounds.

This invention has been described in connection with a number of illustrative ingredients, formulas, proportions and processes, to the details of which disclosure the invention is not, of course, to be limited.

What is claimed is:—

1. The finish remover comprising approximately acetal 10 gallons, acetone 10 gallons, benzol 10 gallons, 7 pounds ceresin and 15 pounds of cork dust.

2. The finish remover comprising approximately acetal 10 gallons, acetone 10 gallons, benzol 10 gallons and stiffening material comprising wax.

3. The finish remover comprising finish solvent material of the acetal order, loosening finish solvent material, aromatic penetrating finish solvent material and incorporated stiffening material including dissolved mineral wax.

4. The finish remover comprising approximately acetal 10 gallons, loosening finish solvent material 10 gallons, aromatic penetrating finish solvent material 10 gallons, and dissolved film-forming evaporation-retarding stiffening material.

5. The finish remover comprising approximately finish solvent material of the acetal order 10 gallons, acetone 10 gallons, penetrating solvent material and incorporated stiffening material including mineral wax.

6. The finish remover comprising approximately acetal 10 gallons, acetone 10 gallons, aromatic penetrating finish solvent material 10 gallons and incorporated stiffening material including dissolved wax.

7. The substantially fluent finish remover comprising composite volatile finish solvent material including a solvent of the acetal order and incorporated evaporation-retarding stiffening material including dissolved wax.

8. The substantially fluent finish remover comprising composite volatile finish solvent material including acetal and incorporated stiffening material including dissolved mineral wax.

9. The substantially fluent finish remover comprising composite volatile organic finish solvent material including a solvent of the acetal order and incorporated stiffening material including dissolved mineral wax.

CARLETON ELLIS.

Witnesses:
JOSEPH J. COLLINS,
JESSIE B. KAY.